United States Patent
Barrett et al.

(10) Patent No.: US 10,145,077 B2
(45) Date of Patent: *Dec. 4, 2018

(54) COUPLER FOR SOIL NAIL AND METHOD OF EMPLACING SAME

(71) Applicant: R&B Leasing, LLC, Grand Junction, CO (US)

(72) Inventors: Colby Barrett, Grand Junction, CO (US); Nathan Beard, Fruita, CO (US); Timothy Allen Ruckman, Phoenix, AZ (US); Matt Birchmier, Grand Junction, CO (US); Todd Hamilton, Cave Creek, AZ (US); Justin Petersen, Fruita, CO (US); Derrick Hayes, Molalla, OR (US)

(73) Assignee: R&B LEASING, LLC, Grand Junction, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,448

(22) Filed: Jul. 6, 2015

(65) Prior Publication Data

US 2016/0010305 A1     Jan. 14, 2016

Related U.S. Application Data

(63) Continuation-in-part of application No. 14/327,132, filed on Jul. 9, 2014.

(51) Int. Cl.
*E02D 5/80* (2006.01)
*E02D 5/56* (2006.01)
*F16B 37/00* (2006.01)

(52) U.S. Cl.
CPC .............. *E02D 5/801* (2013.01); *E02D 5/56* (2013.01); *F16B 37/00* (2013.01)

(58) Field of Classification Search
CPC ............. E02D 5/56; E02D 5/80–5/808; E02D 29/0233; E21D 20/02–20/028; E21D 21/0026
(Continued)

(56) References Cited

U.S. PATENT DOCUMENTS 4,360,292 A * 11/1982 Keeler .................... E02D 5/808
                                                                  405/239
5,653,557 A *  8/1997 Gruber .................... E21D 20/02
                                                                  405/259.1
(Continued)

FOREIGN PATENT DOCUMENTS

WO    WO-2005098165 A1 * 10/2005  ............... E02D 5/76

OTHER PUBLICATIONS

U.S. Appl. No. 14/327,132, filed Jul. 9, 2014, Barrett et al.
(Continued)

*Primary Examiner* — Frederick L Lagman
*Assistant Examiner* — Stacy N Lawson
(74) *Attorney, Agent, or Firm* — Berg Hill Greenleaf Ruscitti LLP

(57) ABSTRACT

A coupler interconnects adjacent sections of soil nails to extend the lengths of the nails. The coupler includes projections extending from the exterior surface of the coupler. The projections serve multiple purposes. One purpose is to center the soil nail within a drilled hole. Another purpose is to provide mixing for amounts of drilled material to remain within the hole, and/or evacuation of drilled material to be removed from the hole. Another purpose is to create a drilled hole with varying diameters in response to different geological layers encountered during drilling. The coupler may include a plurality of ports or openings formed in the body of the coupler enabling injected material such as grout to be further mixed by the rotating action of the coupler during use. The invention further includes a soil nail assembly and
(Continued)

a method for installing a soil nail assembly including couplers with projections.

21 Claims, 8 Drawing Sheets

(58) Field of Classification Search
USPC .............. 405/231, 253, 259.1–262, 302.4; 403/300, 305–307
See application file for complete search history.

(56) References Cited

U.S. PATENT DOCUMENTS

| | | | | |
|---|---|---|---|---|
| 2013/0255169 | A1* | 10/2013 | Henderson | E04C 5/125 52/223.13 |
| 2013/0272799 | A1* | 10/2013 | Suver | E02D 7/00 405/233 |
| 2014/0259991 | A1* | 9/2014 | Atchley | E02D 5/805 52/157 |

OTHER PUBLICATIONS

Samtani et al. "Hollow-Core Soil Nails State-of-the-Practice," U.S. Department of Transportation, Federal Highway Administration, Apr. 2006, 55 pages.

Samtani et al. "Hollow Bar Soil Nails Corrosion Mitigation Recommendations," U.S. Department of Transportation, Federal Highway Administration, Jun. 2009, Publication No. FHWA-CFL/TD-09-001, 79 pages.

* cited by examiner

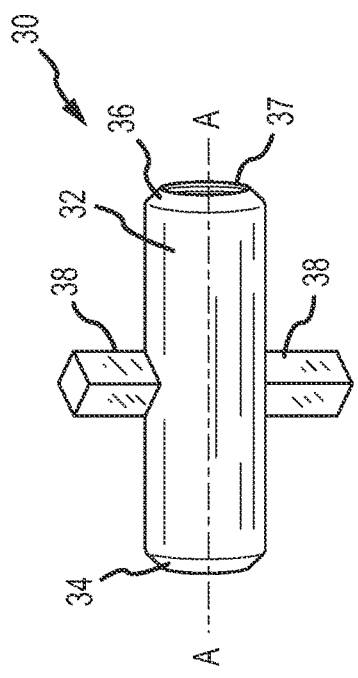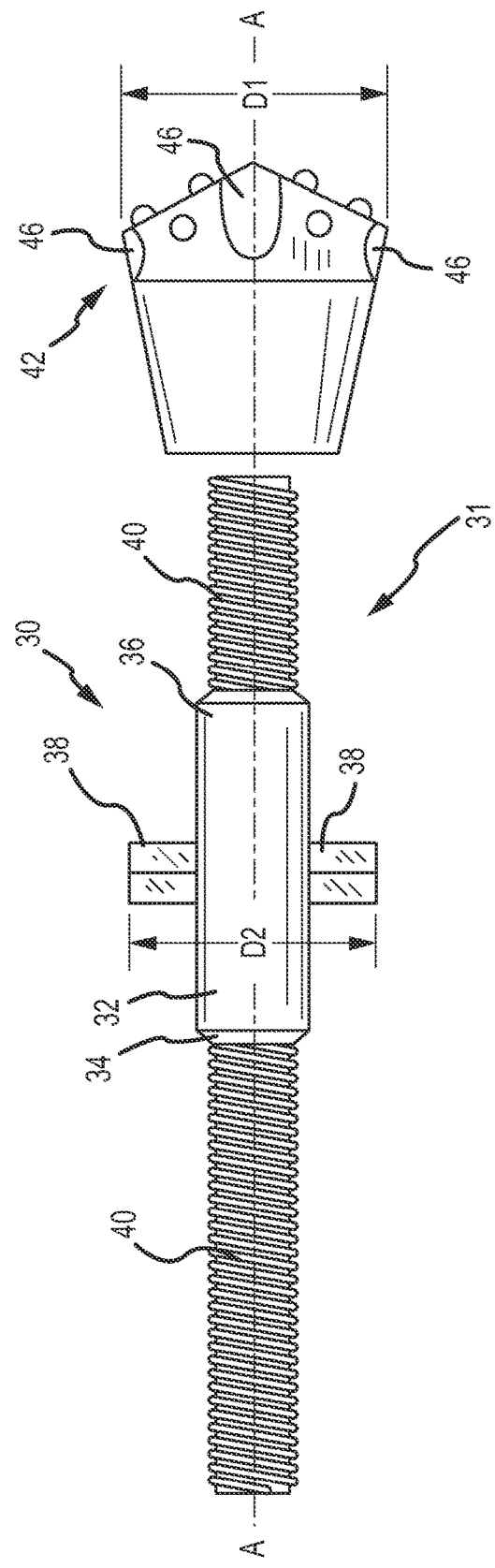

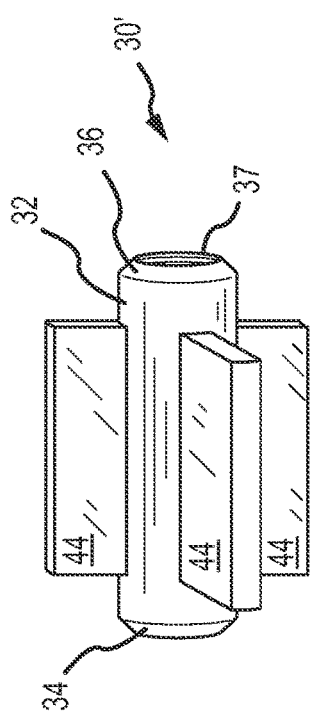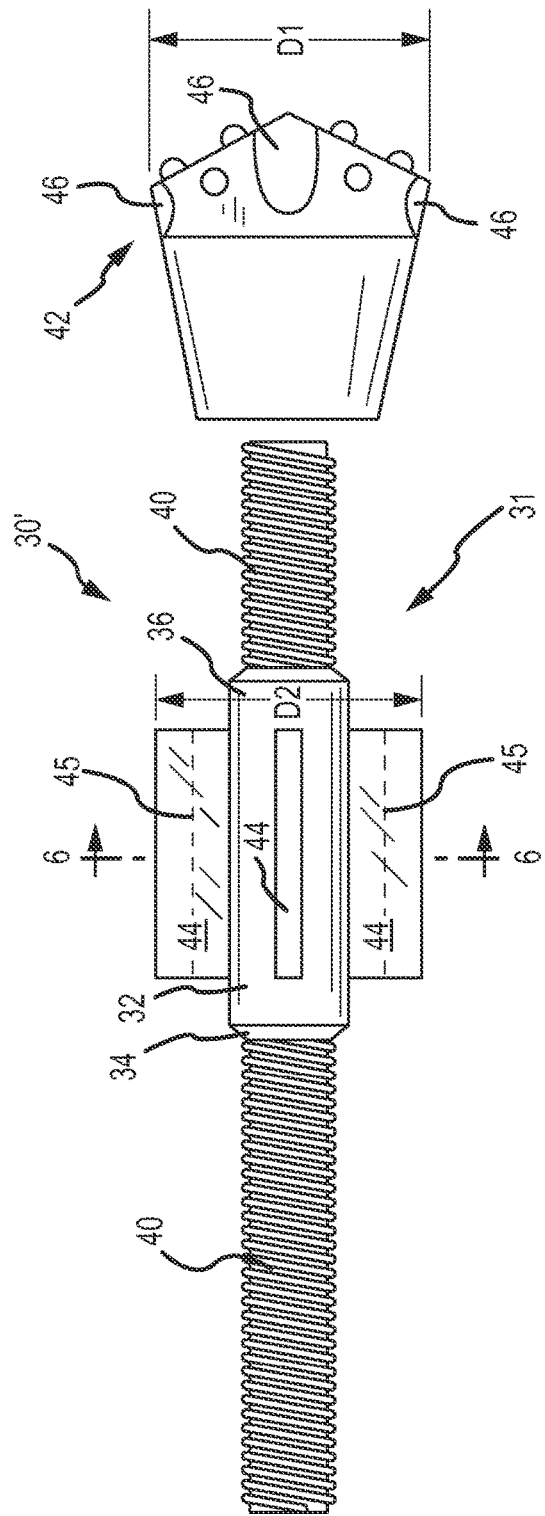

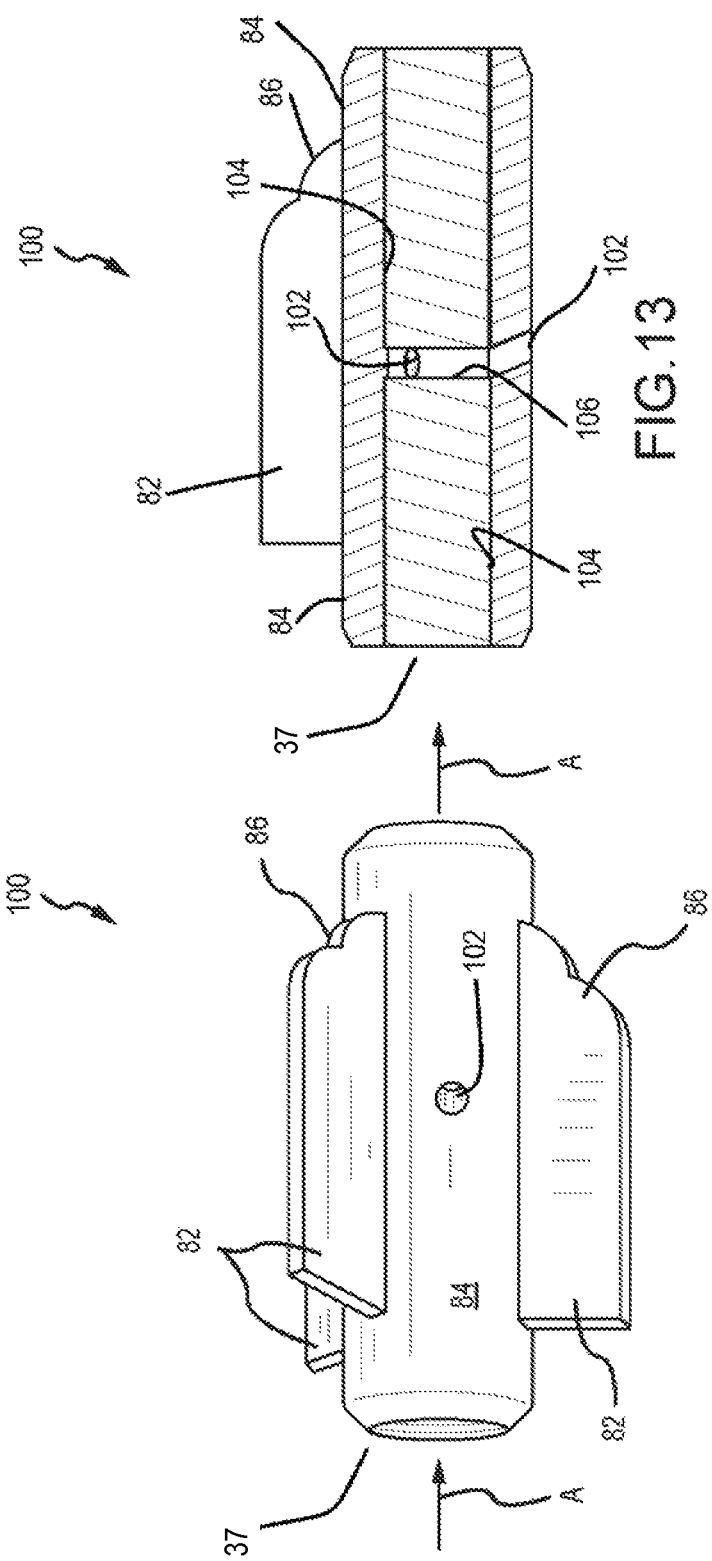

COUPLER FOR SOIL NAIL AND METHOD OF EMPLACING SAME

CROSS REFERENCE TO RELATED APPLICATIONS

This application is a continuation-in-part application of U.S. Ser. No. 14/327,132, entitled "Coupler for Soil Nail and Method of Emplacing Same" filed on Jul. 9, 2014, the entire disclosure of which are hereby incorporated herein by reference.

FIELD OF THE INVENTION

The invention generally relates to subsurface supports placed in the ground, and more particularly, to a coupler for interconnecting adjacent sections of a soil nail assembly, and a method of emplacing the soil nail assembly into the ground.

BACKGROUND OF THE INVENTION

Passive supports such as footers, piles, and caissons are well known subsurface supports for many man-made structures such as bridges, buildings, and the like. These supports may be characterized as "passive" because the earth surrounding the supports must first shift or move to mobilize the available tensile, bending, and/or shear capacities of the supports.

In addition to passive subsurface supports, more recently, it is known to provide ground strengthening by driving elongate reinforcing members, referred to as soil nails, into the ground under and/or adjacent to structures in order to improve the bulk properties of the soil/rock formation that supports the overhead structure. Typically, soil nails are provided in a predetermined array to target improvement of the soil/rock formation at specified locations. Soil nails themselves are not used for direct support of the overhead structure; rather, the soil nails are used to prevent shifting or other undesirable properties or characteristics of the particular geological formation upon which the structure is built.

For methods of supporting ground excavations, excavations supports or shoring can be broadly classified as external and internal. External support methods relate to support provided outside the confines of the excavation. Examples of external supports include berms, rakers, cross-lot bracing, anchors, and cantilever walls. Internal support methods are those methods that provide support by reinforcement directly into the existing ground. Examples of internal supports include the use of soil nails and micropiles.

Soil nail installations may also be generally categorized within two general types. A first type includes soil nail installations that use a solid bar soil nail according to a "drill and grout" method. This method is most efficient in soils where open-hole drilling is possible. However, within caving ground conditions, such as loose soils with cobbles and raveling or running sands, a casing may be required to support the drilled hole. Use of casing substantially slows a soil nailing process, and clearly adds to cost. Therefore, in most circumstances, casings are avoided. The other general type of soil nail installation involves the use of a hollow core soil nail in which an oversized sacrificial drill bit is used as a cutting tool to advance the hole. The drill bit includes a plurality of holes or passageways that communicate with the hollow core of the attached soil nail. The soil nail is rotated along with the drill bit during installation, and is advanced using force applied by, for example, a percussion hammer.

Once the hollow core soil nail bar is advanced to a desired depth in the drilled hole, it is left in the hole along with the drill bit. Grout is then pumped at high pressure through the hollow core of the soil nail and through the drill bit. Ultimately, grout pressure forces the grout back along the outside surfaces of the soil nail bar and towards the surface to fill the drilled hole. The hollow core soil nail bar therefore acts as a grouting conduit in addition to its primary purpose as a subsurface reinforcement element. In many cases, the simultaneous actions of drilling the hole, installing the soil nail, and grouting the nail within the hole is more efficient than the conventional "drill and the grout" method of installation, and is certainly more efficient than the conventional method of installation requiring use of a casing within the drilled hole.

Another specific advantage of a soil nail installation using hollow core soil nails and a sacrificial drill bit with grout conveying passageways, is that a better "grout to ground" bond may be achieved. The dynamic rotary pressure grouting characteristic of the method enables the grout to better permeate the geo-material surrounding the drilled hole as compared to the "drill and grout" method. Improved permeation into the surrounding geo-material results in an improved bond between the grout and the geo-materials. The area into which penetration of the grout occurs into the geo-material is referred to as a permeation zone. The permeation zone may vary between soil types, but nonetheless, the pressurized grouting aspect of the hollow core soil nail method appears to improve the thickness of the permeation zone for all soil types. An increased permeation zone directly improves the pullout resistance or capacity of the soil nail installed. Additionally, this method also provides improved stiffness load deformation capacities that can be observed during pullout testing of an installed hollow core soil nail.

Various accessories are used with soil nail installations. One often used accessory is a bearing plate that is mounted to the exposed end of the soil nail. The bearing plate provides a compression force against the exposed surface of the excavation, and serves to stabilize the soil nail in its installed orientation. Particularly for relatively loose and caving soils, a bearing plate is selected in a size to ensure an adequate amount of pressure can be distributed across an area of the exposed surface of the soil to keep the soil nail in place without appreciable shifting.

Another accessory commonly used is a "centralizer", and this accessory is used to centralize the soil nail in the drilled hole so that an even distribution of grout can be achieved circumferentially around the soil nail. A misaligned or off-center soil nail results in at least one side of the soil nail being placed in close proximity to the surrounding geomaterial, thereby resulting in a poor grout to ground bond at that location. The soil nail is likely to prematurely rust or corrode due to its closer proximity to moisture in the geomaterial. For hollow core soil nails that are rotated along with the sacrificial drill bit during installation, the current solution is to provide a "mobile centralizer" that is loosely mounted over a desired section of the soil nail. The intended operation for these centralizers is to allow them to freely rotate and move along the length of the soil nail during the installation process. A typical example of a mobile centralizer is one that has an inside diameter greater than the outside diameter of the hollow core bar, but a smaller outside diameter as compared to the outside diameter of a coupler used to interconnect adjacent sections of a soil nail. A common shape for these centralizers is a ring shaped body and a plurality of spacers that extend radially outward from the body. The spacers provide the centering capability for keeping the soil nail centered within the hole.

While these mobile centralizers may be adequate for their intended purposes in many installations, there are also some limitations associated with use of such mobile centralizers. Due to the oversized interior diameter of the ring shaped body, the centralizer itself can become jammed and held against a surface of the bar over which it is mounted. This jammed orientation is caused by a partial rotation of the centralizer with respect to the longitudinal axis of the soil nail such that the spacers of the centralizer are not oriented perpendicular to the soil nail and therefore, do not keep the soil nail centered within the drilled hole. Additionally, mobile centralizers are limited in size—their diameter cannot exceed the diameter of the drill bit because a mobile centralizer with a diameter greater than the drill bit will inevitably become jammed in the hole, thus preventing advancement of the drill bit, and possibly resulting in damage to the soil nail assembly as it continues to rotate. Mobile centralizers are subject to whatever forces are present within the drilled hole, and the centralizers cannot be precisely positioned along any certain point over the soil nail. Without consistent spacing between centralizers, a soil nail may not be optimally centered in the drilled hole. A disadvantage associated with commercially available centralizers is that they are not made of steel like the couplers and soil nails. Because of the relatively complex shape of the mobile centralizers, and perhaps for cost reasons, they are cast. For example, many mobile centralizers are made from a cast iron coated material known to corrode more quickly than the soil nail sections and coupler. Use of a cast iron centralizer with steel soil nail sections and couplers also results in a dissimilar metal environment within the drilled hole. The dissimilar metals can cause a galvanic reaction that accelerates corrosion of the coupler and soil nail sections.

In excavations for many projects, there can be distinct layers of geo-material encountered. For example, in landslide areas, the upper soil layer may comprise relatively loose fine sands, and small rocks that have a low bond strength with an installed soil nail. In this example, the length of the nail must be extended such that the distal end or lower portion of the soil nail penetrates into denser geo-material under the landslide debris. The extension is typically achieved with a coupler that interconnects two sections of soil nails. The specified bond strength for the installation may be primarily dependent upon on the lower portion of the soil nail penetrating the denser geo-material. The proximal or upper portion of the soil nail may still require a larger than normal bearing plate in order to compensate for the reduced bond strength by increasing bearing capacity applied by the plate to the upper layer of loose soil. It is clear that the overall cost and complexity of an installed soil nail increases in this case because the bearing plate must be oversized.

It should therefore be apparent that there are many unmet needs associated with soil nail assemblies, soil nail accessories, and methods of emplacement.

SUMMARY OF THE INVENTION

According to the invention, a coupler is provided for interconnecting adjacent sections of soil nail members in order to extend a length for a soil nail to be installed. The coupler includes a plurality of projections or wings extending from the exterior surface of the coupler. The projections serve multiple purposes. One purpose is to provide centering for the soil nail within a drilled hole. Another purpose is to provide mixing for selected amounts of drilled material to remain within the hole, and/or evacuation of drilled material to be removed from the hole. Another purpose is to create a drilled hole with varying diameters in response to different geological layers encountered during drilling. With respect to this latter purpose, the coupler with projections serves as a secondary or additional drill bit implement. The size of the projections can be altered to selectively enlarge a portion of a drilled hole. For example, in the case of an upper layer of earth that is loose and subject to caving as compared to a lower denser layer of earth, a soil nail assembly is provided with a coupler incorporating enlarged projections. A distal section of soil nail extends beyond the coupler and is connected to a drill bit. The drill bit drills a hole into the denser layer of earth. The coupler with the enlarged projections creates a section of the hole with a larger diameter. The larger hole diameter for the upper section of the drilled hole increases the surface area available for grout to bond to the surrounding geomaterial and the section of soil nail above the coupler. Accordingly, the overall bond strength for the installed soil nail can be increased without having to conduct a separate drilling step for creating an enlarged diameter hole. The increased hole diameter also provides greater protection for the soil nail since the thickness of the grout cover is increased.

One particular concern for installation of all soil nails is the potential for corrosion to damage the nails. Most soil nails are coated with a protective coating; however, over time, considerable forces are applied to the nail along with corrosive chemicals in the soil/rock that will ultimately corrode the soil nails. Particularly for geological formations such as landslide areas, the soils within these formations tend to be more corrosive than underlying rock layers. Therefore, a larger diameter hole within such corrosive soils not only provides increased surface area for enhancing bond strength, but also greater corrosion protection because of the increased grout cover. Additionally, the increased bond strength achieved may eliminate the need for a bearing plate, or at least substantially reduce the size of the bearing plate.

The larger diameter upper hole is drilled simultaneous with drilling of the lower hole. Therefore, in one aspect, the coupler with enlarged projections serves both as a spacer or centralizer for centering the soil nail within the hole and as a drill tool. The surfaces of the projections can be selected to provide the desired drilling/cutting action desired in order to enlarge the diameter of the portion of the hole exposed to the coupler with enlarged projections. Additionally, the coupler may be designed so that there can be a specified breakaway force allowing predictable separation of the projections from the coupler body. It is undesirable for the projections to generate excessive force in contact with the surrounding earth that would prevent the soil nail from being efficiently advanced to the desired depth. In the event such excessive forces are present, the projections break away from the coupler thereby preventing damage to the soil nail that may otherwise twist or contort in response to the excessive forces present. Thus, in the case where an upper layer of earth is loose and less dense, when the coupler reaches a deeper, denser earth that does not require a larger diameter hole, the projections can separate from the body of the coupler. The projections may include a frangible joint or weakened area that is designed to break when a predetermined force or torque is applied to the projections. Therefore in another embodiment, the projections may incorporate a frangible joint that enables a portion of the projections to break away in the event the coupler reaches a layer of earth that is of a predetermined or known density, and it is known that the earth may present an obstacle for the coupler to the extent the coupler and/or the soil nails may be damaged. The frangible joints may be formed on one or more selected projections to enable a proximal or inner radial portion of each projection to remain attached to the body of the coupler while a corresponding distal or outer radial portion of each projection may break thereby separating the distal portion of the projection from the proximal portion. The frangible joints may be formed at selected radial distances along the projections to thereby reduce the overall effective diameter of the hole to be drilled/widened at that point in the emplacement of the soil nails.

Also according to the invention, a method is provided for installing a soil nail assembly in which one or more couplers are provided to extend the overall length of a soil nail to be installed. One of the couplers may include projections of a first size having a diameter less than the diameter of the sacrificial drill bit. Another coupler may include projections of a second different size having a diameter that is greater than the diameter of the sacrificial drill bit in order to enlarge the diameter of a selected section of the drilled hole. In the event a coupler is used at a location close to the drill bit, this coupler may not require projections since the drill bit itself can serve as a centralizer for the most distal section of the soil nail.

According to another feature of the invention, the particular shape of the projections attached to the coupler body are selected to achieve the desired objective of the coupler for use in the soil nail assembly. For example, the projections for one coupler may have leading cutting edges especially adapted for drilling through surrounding material. The projections in another coupler may have leading edges especially adapted for evacuating drilled material from within the hole, or for mixing drilled material within the hole.

According to another feature of the invention, one or more ports are made in the body of the coupler. One primary purpose for the ports is to create better mixing of grout in which grout is capable of passing through the body of the coupler and out through the ports. The spinning or rotating action of the coupler during installation induces better mixing action of the grout as it passes out through the ports within a drilled hole.

In accordance with one aspect of the invention, it may therefore be considered a coupler especially adapted for use in interconnecting two adjacent sections of soil nails, the coupler comprising: (i) a body having a threaded opening formed through the body, the body having a length and a longitudinal axis, the threaded opening extending along the longitudinal axis; and (ii) a plurality of projections mounted to an exterior surface of the body, the projections extending radially outward from the longitudinal axis; and (iii) at least one port formed in said body and communicating with said threaded opening.

According to another aspect of the invention, it may be considered a soil nail assembly comprising: (a) a first coupler including (i) a body having a threaded opening formed through the body, the body having a length and a longitudinal axis, the threaded opening extending along the longitudinal axis; (ii) a plurality of projections mounted to an exterior surface of the body, the projections extending radially outward from the longitudinal axis; (iii) at least one port formed in said body and communicating with said threaded opening; (b) a first section of soil nail having a proximal first end and a distal second end, the distal second end threadably received in a first end of the first coupler; (c) a second section of soil nail having a proximal first end and a distal second end, the proximal first end threadably received in a second end of the first coupler; (d) a drill bit secured to the distal second end of the second section of soil nail; and (e) the first and second sections of soil nail having hollow cores such that a continuous opening is formed through the first coupler and the first and second sections of soil nail.

According to a similar aspect of the invention, it may be considered a soil nail assembly comprising: (a) a first coupler including (i) a body having an opening formed through the body, the body having a length and a longitudinal axis, the opening extending along the longitudinal axis; (ii) a plurality of projections mounted to an exterior surface of the body, the projections extending radially outward from the longitudinal axis; (iii) at least one port formed in said body and communicating with said threaded opening; (b) first and second sections of soil nail received and secured in respective opposite ends of the first coupler; (c) a drill bit secured to a distal end of one of the first or second sections of soil nail; and (d) a second coupler including (i) a body having an opening formed through the body, the body having a length, and the opening extending along the longitudinal axis; (ii) a plurality of projections mounted to an exterior surface of the body of the second coupler, the projections extending radially outward from the longitudinal axis, one end of the first or second sections of soil nail received and secured in an end of the second coupler; and wherein the plurality of projections of the first coupler extend radially outward a first distance from the longitudinal axis, and the plurality of projections of the second coupler extend radially outward a second different distance from the longitudinal axis.

In yet another aspect of the invention, it may be considered a method of installing a soil nail assembly into the earth, the method comprising: (a) providing a first coupler including (i) a body having a threaded opening formed through the body, the body having a length and a longitudinal axis, the threaded opening extending along the longitudinal axis; (ii) a plurality of projections mounted to an exterior surface of the body, the projections extending radially outward from the longitudinal axis; (iii) at least one port formed in said body and communicating with said threaded opening; (b) providing a first section of soil nail having a proximal first end and a distal second end, the distal second end threadably received in a first end of the first coupler; (c) providing a second section of soil nail having a proximal first end and a distal second end, the proximal first end threadably received in a second end of the first coupler; (d) providing a drill bit secured to the distal second end of the second section of soil nail, the drill bit having at least one bore formed through the drill bit, wherein the first and second sections of soil nail each have hollow cores such that a continuous opening is formed through the first section of soil nail, through the first coupler, through the second section of soil nail, and through the drill bit; (e) drilling the drill bit into the earth to form a hole of a desired depth; (f) evacuating at least some drilled material from within the hole; and (g) pumping grout through the first section of soil nail, through the first coupler, through the second section of soil nail, and then through the drill bit into the hole to thereby fill the hole with a desired amount of grout for stabilizing the soil nail assembly in the earth.

From the foregoing, there are apparent advantages to the invention. One advantage is the ability to balance and control bond strength for the entire length of the soil nail, regardless of the different types of geomaterial that are encountered during drilling. Selected lengths of soil nail sections can be coupled together in which couplers have selected sized and shaped projections to produce discrete sections of the drilled hole with different diameters to balance required bond strengths over the entire length of the soil nail. This selective bond strength control feature is achieved within a single drilling action, and re-drilling is avoided, decreasing the time and cost of installation of a soil nail. As mentioned, bearing plates can be eliminated in some cases, or at least reduced in size, further reducing the cost and effort associated with installation. Another advantage is the enhanced grout coverage for not only the sections of soil nail, but also for the coupler itself. Because sections of a drilled hole can be selectively sized in terms of diameter, specifications can be met for grout coverage along any portion of the length of the nail. Because a coupler has a slightly enlarged diameter as opposed to the adjacent sections of soil nail, the coupler may be installed without meeting necessary grout coverage requirements. The larger diameter of the coupler inherently results in less grout coverage at that location. The attached projections extending from the coupler serve to increase the overall surface area of the grout in contact with the coupler. Therefore, the coupler itself has an enlarged surface area not only allows for centering the soil nail, but also for enhancing grout coverage over the coupler. The projections are preferably made of the same type of metal as the coupler and soil nails; therefore, undesirable galvanic reactions can be avoided. Alternatively, based upon the nature of the surrounding earth and grout, it is also contemplated that the projections can be made of a material which inhibits a natural galvanic reaction that may take place over time within the particular environment of the drilled hole. In accordance with this aspect of the invention, it is also contemplated that the projections can be made of alloys having anode or cathode characteristics that will counteract known corrosive and galvanic reacting soils.

BRIEF DESCRIPTION OF THE DRAWINGS

FIG. 2 is a perspective view of a coupler in a first embodiment for interconnecting two adjacent sections of soil nail;

FIG. 3 is a side view of the coupler of FIG. 2 incorporated within a soil nail assembly;

FIG. 4 is a perspective view of a coupler of a second embodiment;

FIG. 5 is a side view of the coupler of FIG. 4 incorporated within a soil nail assembly;

FIG. 12 is a perspective view of a coupler in a fifth embodiment; and

FIG. 13 is a cross sectional view of the coupler of FIG. 12.

DETAILED DESCRIPTION

Figure 1:
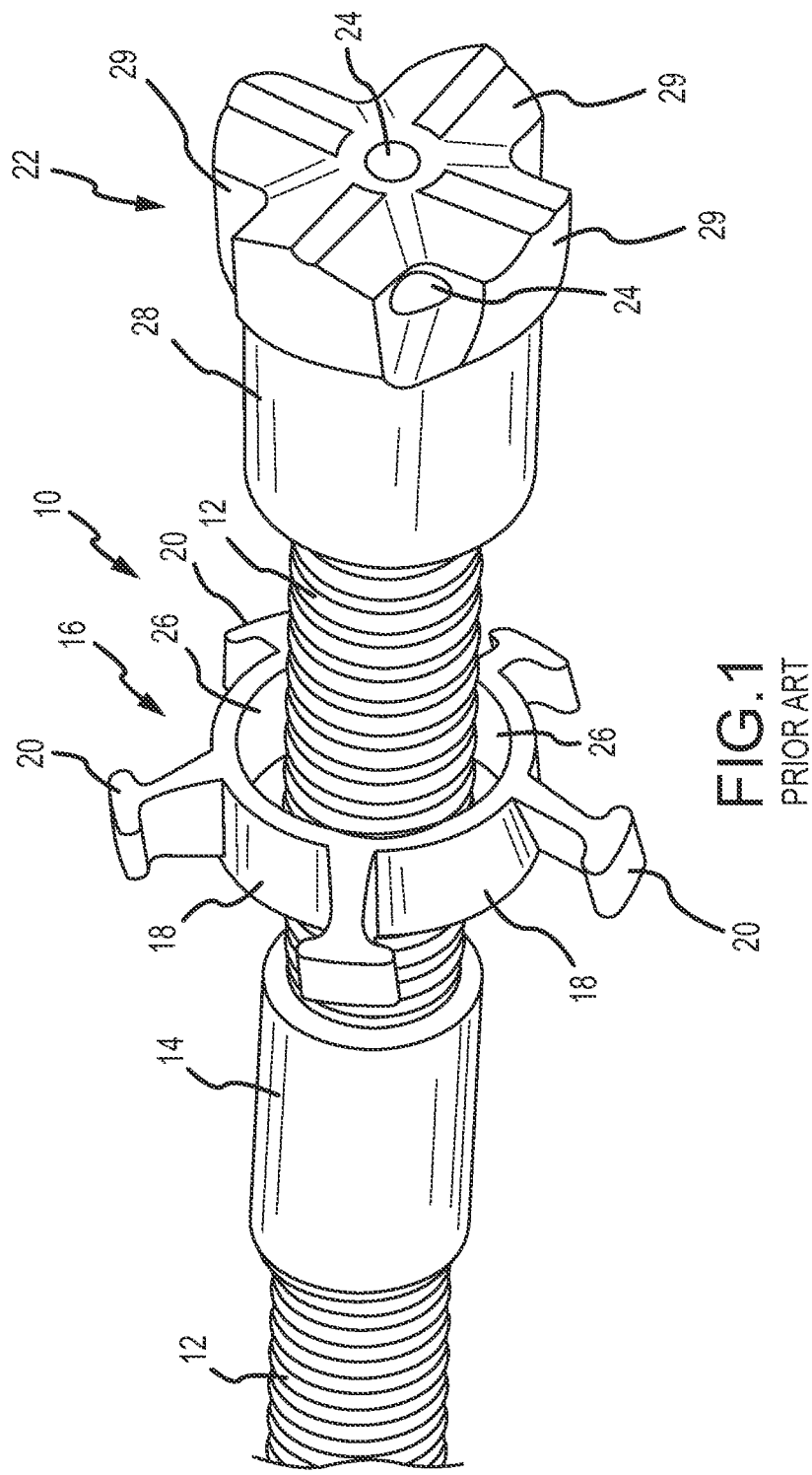
FIG. 1 is a perspective view of the prior art soil nail assembly.

FIG. 1 illustrates a prior art soil nail assembly 10. The assembly 10 includes a coupler 14 that interconnects adjacent ends of two soil nail sections or pieces 12. The distal end of the assembly has a sacrificial drill bit 22 secured to a distal end of the second soil nail section 12. The drill bit includes a hollow body 28 that is threadably connected to the distal end of the second soil nail section 12. A cutting portion 29 of the drill bit is formed by a plurality of cutting edges. A centralizer 16 is mounted over the second soil nail section, and is used to center the assembly 10 within the drilled hole. The centralizer has a retaining ring 18 and a plurality of spacers 20 that extend radially outward from the retaining ring 18. As shown, the spacers 20 may have a "T" shape. The interior surface 26 of the retainer ring 18 defines an inner diameter that is smaller than the diameter of the exterior surface of the coupler 14. This inner diameter is also smaller than the diameter of the body 28 of the drill bit 22. Accordingly, the centralizer 16 is free to move or slide on the soil nail section 12 between the coupler 14 and the hollow body 28 of the drill bit 22. The movement of the centralizer 16 may also cause the inner surface 26 to rub against the exterior surface of the soil nail pieces 12, damaging protective coatings thereon.

During installation of the soil nail assembly, a hole is drilled to a sufficient depth. The soil nail sections 12, coupler 14, drill bit 22, and mobile centralizer 16 remain in the hole. The drill bit further includes a plurality of channels or passageways 24 that communicate with the hollow body 28 that receives the distal end of the second soil nail section 12. Grout is forcibly pumped through the soil nail sections 12 and coupler 14, and through the channels 24 of the drill bit 22 so that grout may flood open space in the drilled hole. The gap between the interior surface 26 of the mobile centralizer 16 and the exterior surface of the soil nail 12 is required so that the grout forced through the channels 24 can then pass proximally and unimpeded over the soil nail sections 12 and coupler 14. As mentioned, there are a number of limitations associated with a mobile centralizer.

Referring to FIG. 2, a coupler 30 is shown in a first embodiment of the invention. The coupler 30 has a body 32, and first and second ends 34 and 36. A length of the coupler 30 is defined by the distance between the ends 34 and 36. The coupler has a bore or opening 37 that may be threaded to receive adjacent ends of soil nail sections to be joined. A pair of projections or wings 38 are attached to the exterior surface of the body 32. In FIG. 2, two projections are shown spaced approximately 180° from one another. The projections are also shown as being made from rectangular stock in two substantially equal lengths. The projections 38 may be generally defined has having quadrilateral cross sectional shapes as shown. In one embodiment, the projections 38 are made from ¾ inch rectangular stock that is cut to a desired length and welded to the exterior surface of the body 32. In another embodiment, the projections 38 are integrally formed with the body 32 in a casting or a forging process. The projections also are shown as extending substantially perpendicular to a longitudinal axis A-A of the coupler. In one embodiment, the projections extend from the body 32 of the coupler 30 a distance substantially equal to the diameter of the body 32. In another embodiment, the projections 38 extend approximately 2 inches from the body. Although various dimensions have been used to describe exemplary embodiments of the projections 38, it is expressly contemplated that the dimensions of the projections may be varied and still comport with the scope and spirit of the present invention. The term "projection" is used herein to generically describe the structure in each of the coupler embodiments that are attached to and extend radially away from the coupler body.

Referring to FIG. 3, the coupler 30 is shown within a soil nail assembly 31. The soil nail assembly 31 includes two soil nail sections 40 that are joined by the coupler 30. The soil nail assembly 31 is also shown as extending along the longitudinal axis A-A. The facing ends of the soil nail sections 40 may be threadably received in the bore 37 of the coupler. A sacrificial drill bit 42 is secured to the distal end of the distal or second soil nail section 40. The drill bit itself has a threaded opening that receives the free end of the distal soil nail section. The drill bit may include a plurality of passageways or channels 46 for passing grout to the interior space within a drilled hole. Preferably, the diameter $D_1$ of the drill bit is greater than the diameter or distance $D_2$ between the opposite ends of the projections 38. It is generally undesirable to interfere with the drilling action of the drill bit, which could occur if the diameter/distance $D_2$ was greater than the diameter $D_1$. The particular orientation of the projections 38 for the embodiment of FIG. 2 can be described as having a length or long axis that extends substantially perpendicular to the length or long axis A-A of the coupler 30 and coupler assembly. The lengths of the projections are also less than the overall length of the coupler. The projections may be welded to the exterior surface of the body 32. The coupler may also be integrally formed with the projections in a casting process or in a forging process.

Referring to FIG. 4, a coupler 30' is illustrated in another embodiment. This embodiment differs in that the projections include a plurality of substantially planar plates or fins 44. More specifically, the plates/fins 44 have each have a length that extends substantially parallel with the length of the coupler, and each plate/fin 44 having a width defining the extent to which the plates extend radially outward from the exterior surface of the coupler 30'. FIG. 4 illustrates three plates/fins that are equally spaced from one another, therefore, being spaced approximately 120° from one another.

Referring now to FIG. 5, the coupler 30' is shown within soil nail assembly 31. As with the coupler 30 of the first embodiment, the distance/diameter $D_2$ of coupler 30' is less than the diameter $D_1$ of the drill bit 42. One advantage of providing three plates/fins 44 is that it further increases the available surface area for bonding between the coupler and grout. Another advantages the ability of the plates/fins to better mix drilled material in the hole with grout that eventually fills the hole. One modification contemplated for the planar shaped plates 44 is that they can alternatively be shaped in a helical pattern about the exterior surface of the body 32. In this helical configuration, the shapes of the projections may assist in evacuating drilled material in the hole, similar to the evacuating action of helical arranged flutes on a drill bit. The planar shaped plates 44 may be welded to the exterior surface of the body 32 of the coupler 30'. It is also contemplated that the planar shaped plates 44 may include a frangible joint that is designed to break when a pre-determined amount of force or torque is applied to the plates 44. An example of a location where frangible joints may be formed on the plates 44 are shown as the dashed lines 45 in FIG. 5. When the frangible joint breaks, the plates 44, or portions of the plates, separate from the body 30'. Thus, the plates can be designed to break away from the coupler when an excessive force is generated during the drilling to prevent damage to the coupler 30' or the soil nail assembly 31.

Figure 6:
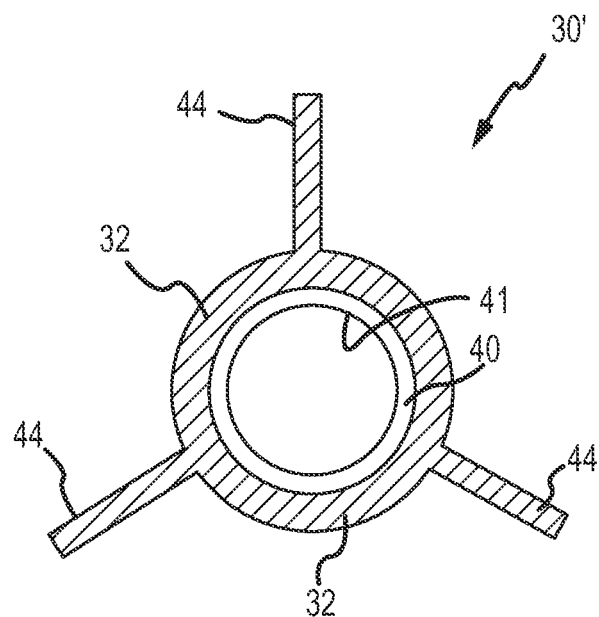
FIG. 6 is a cross-sectional view taken along line 6-6 of FIG. 5.

Referring to FIG. 6, a cross-sectional view is provided showing the spaced configuration of the plates 44 around the body 32 of the coupler 30'. Also shown in this Fig. is one of the soil nail sections 40, and the interior surface 41 of the soil nail section 40 that maintains a continuous opening or bore through the coupler 30'. As described, grout fills the bore as grout is forcibly pumped through the soil nail assembly.

Figure 6A:
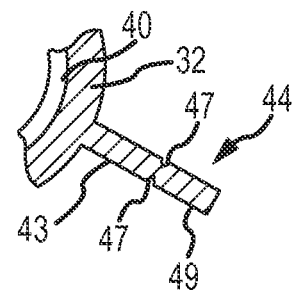
FIG. 6A is an enlarged portion of the cross-sectional view of FIG. 6 showing an optional frangible joint incorporated on a projection of the coupler.

FIG. 6A provides an example of an optional frangible joint formed along one of the plates 44. The frangible joint is defined by a thinned section of material shown as opposing grooves 47 that will allow a distal portion 49 to break free under adequate force, to include the inherent stresses and torques the coupler may be subject to during emplacement. After separation of the distal portion 49, the proximal portion 43 of the plate 44 remains attached to the body 32. A frangible joint can be incorporated on one or a selected number of the plates 44. The location where the frangible joint(s) is located on each plate can also be independently selected for each of the plates 44. In yet another aspect of this embodiment, more than one frangible joint could be incorporated on a single plate 44 such that the joints would progressively break off as they encounter varying earth densities during emplacement.

Figure 7:
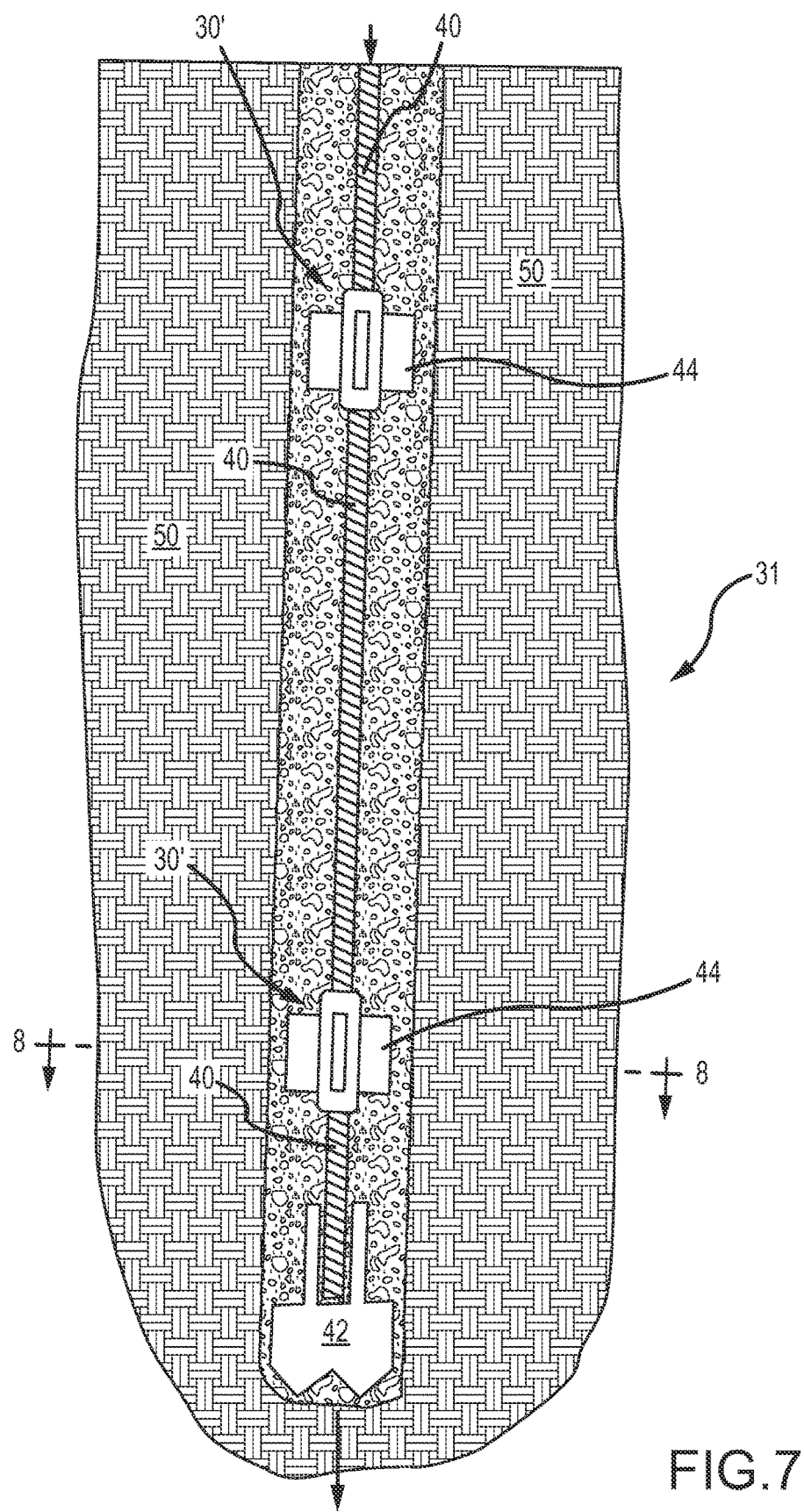
FIG. 7 is a side view of an installed soil nail assembly including two couplers positioned within a drilled hole.

Referring to FIG. 7, a soil nail assembly 31 is illustrated with two couplers 30' that join respective soil nail sections 40. In the example of FIG. 7, both of the coupler's 30' include projections 44. However, in another aspect of the invention, it is also contemplated that the lead or distal coupler 30' may not require projections, particularly if the length of the soil nail section 40 between the drill bit 42 and the lead coupler 30' is relatively short.

Figure 8:
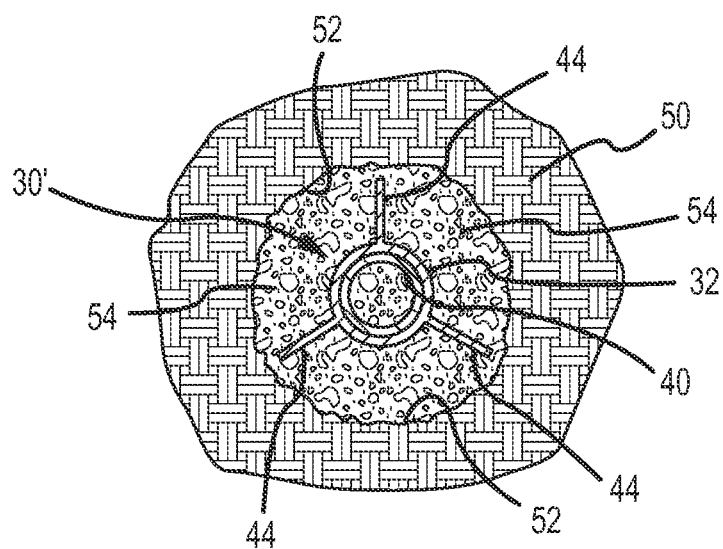
FIG. 8 is a cross sectional view taken along line 8-8 of FIG. 7.

Also referring to the cross sectional view of FIG. 8, the hole 52 is drilled into the earth 50 such that the hole 52 has a diameter that is slightly larger than the outer diameter of the drill bit 42. The couplers 30' are therefore arranged in the hole such that there is small gap between the most radial or outward surfaces of the projections 44 and the interior surface of the hole 52. Grout 54 fills the interior space of the hole 52, to include space between the projections 44. As can be appreciated by a review of FIGS. 7 and 8, the couplers 30' provide consistent centering features in which the soil nail assembly remains centered within the hole 52, with variances being dependent only upon the size of the small gaps between the interior surface of hole and the outer or most radial surfaces of the projections 44.

Because the projections 44 are rigidly attached to the couplers, the projections serve to mix drilled material that remains within the hole. The projections 44 also act as secondary drill bits in order to provide a hole with a more consistent diameter, particularly for those soil types that may be prone to caving. Additional advantages of the invention should be apparent by a review of the FIGS. 7 and 8 and taking into consideration the prior explanations.

Figure 9:
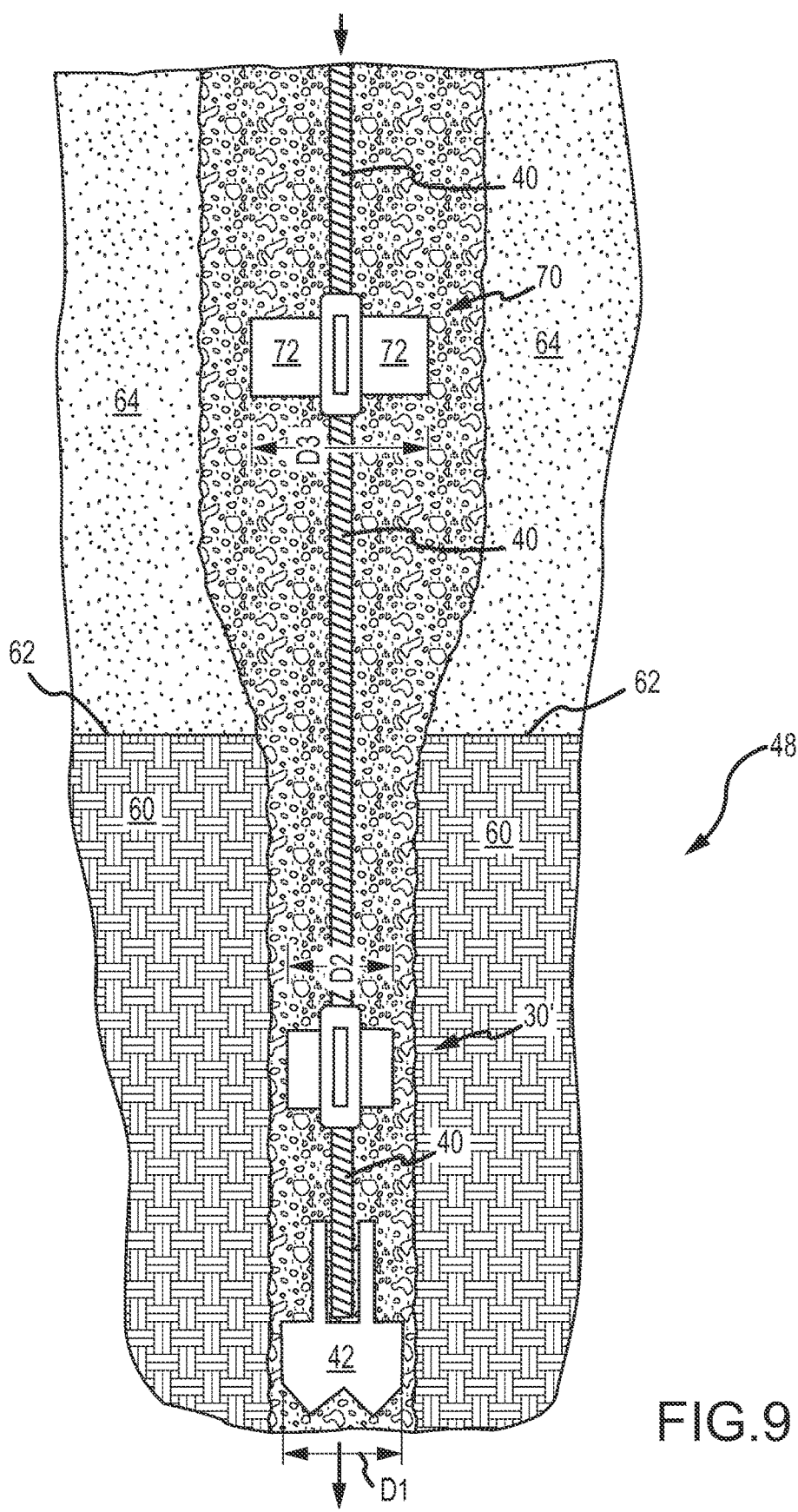
FIG. 9 is another side view of an installed soil nail assembly including two couplers positioned within a drilled hole, and the couplers having different sized projections resulting in the drilled hole having two distinct sections with different diameters.

Referring now to FIG. 9, a soil nail assembly 48 is illustrated in yet another preferred embodiment. In FIG. 9, a first or a lead coupler 30' includes a plurality of projections having an effective diameter $D_2$ that is smaller than the effective diameter $D_1$ of the drill bit 42. As also shown, the lead or most distal soil nail section 40 is advanced into a relatively dense geological formation 60, such as rock. The middle or second soil nail section 40 spans between a transitional area or zone 62 that defines the interface or change between the denser material 60, and a less dense or loose cover soil 64. This type of ground formation may be found in a number of environments, such as a landslide area or river basin in which a loose, less dense layer of material covers an underlying rock or clay formation. The second soil nail section has a proximal end connected to another coupler 70 with a plurality of larger projections 72. A third or proximal soil nail section connects to the opposite end of the coupler 70 and may extend to the surface of the hole (not shown). The plurality of larger projections 72 may each have a proximal portion attached to the exterior surface of the body of the coupler 70. The effective diameter of the proximal portions of a coupler 70 may be approximately equal to the diameter $D_2$ of the projections of coupler 30'. A frangible joint may separate a distal portion of the larger projections 72 from the proximal portion. The proximal portion of the larger projections 72 may be thicker or made of a different material than the distal portion of the larger projections 72.

According to the orientation of FIG. 9, as the soil nail assembly 48 is advanced in the up to down direction, the larger fins 72 of the coupler 70 are able to a drill a hole of a larger diameter in the less dense material 64. Since the volume of the hole increases within the looser geomaterial 64, this allows for an increased volume of grout to contact the interior sidewall of the hole at that location. Accordingly, the bond strength for the soil nail assembly 48 is improved along the hole within the looser geomaterial 64. Further, if the soil nail assembly 48 is advanced deeper into the ground and the coupler 70 reaches the transitional area 62, the distal portions of the larger projections 72 will contact the denser material 60. As the coupler 70 advances into the denser material 60, the frangible joint may sever separating the distal portions of the larger projections 72 from the coupler 70. After the frangible joint severs, the coupler 70 has an effective diameter $D_2$ that is less than the diameter $D_1$ of the drill bit 42.

As should be appreciated, a soil nail assembly 48 as described in the embodiment of FIG. 9 provides the opportunity for a user to specifically tailor components in the soil nail assembly to automatically adjust the diameters of discrete sections of the hole in response to the particular geological formation encountered. Placement of the soil nail assembly can still be achieved in yet a single drilling operation. Each of the couplers 30, 30', 70, 80 installed serve multiple purposes as described including effective centering of the soil nail sections within the hole, drilling of variable sized hole section diameters, enhanced mixing and/or evacuation of drilled material, and increasing surface area for bonding between the couplers and grout.

Figure 10:
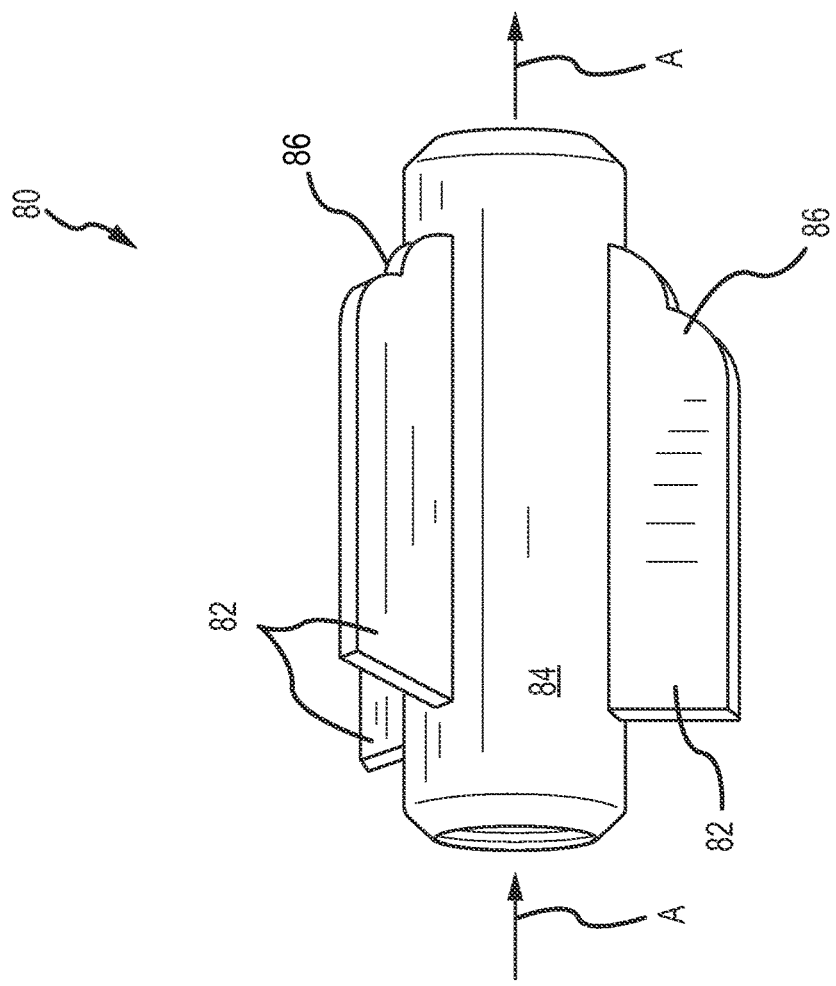
FIG. 10 is a perspective view of a coupler in a third embodiment.

Referring to FIG. 10, another embodiment for a coupler 80 is illustrated. In this embodiment, the coupler 80 has a body 84 with a plurality of planar shaped fins or projections 82, but the fins/projections also include forward cutting or drilling edges 86. Directional arrows A indicate the direction in which the coupler is advanced and how the coupler is to be directionally oriented between adjacent soil nail sections attached to the coupler. The cutting edges 86 may include angled serrations that assist in a drilling or cutting action as the soil nail assembly is advanced into the drilled hole. Therefore, this embodiment is intended to illustrate fins/projections 82 in which drilling is improved with the forward oriented cutting or drilling edges 86 for situations in which it may be desired to widen the diameter of the drilled hole in a particular section.

Figure 11:
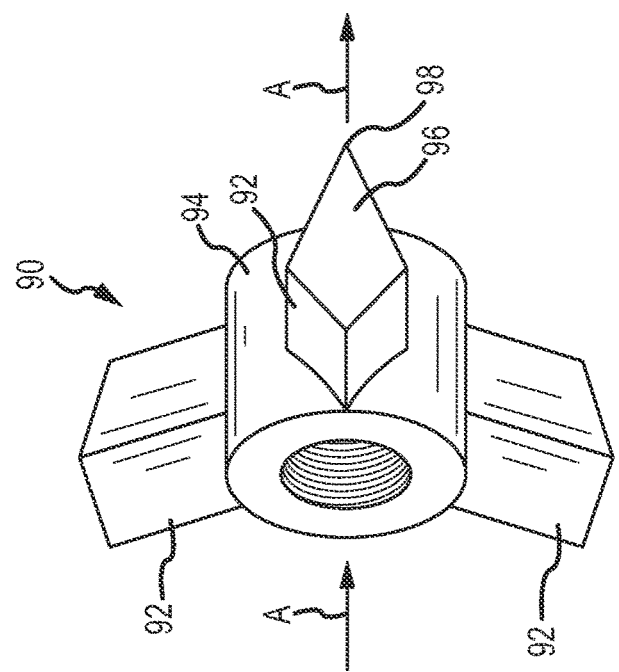
FIG. 11 is a perspective view of a coupler in a fourth embodiment.

Referring to FIG. 11, yet another embodiment for a coupler 90 is illustrated. In this embodiment, the coupler 90 has a body 94 with a plurality of fins or projections 92. Directional arrows A again indicate the direction in which the coupler is advanced and how the coupler is to be directionally oriented between adjacent soil nail sections attached to the coupler. The radial exposed surface 96 of one of the projections 92 shows the projections 96 have a cross sectional shape in the form a quadrilateral, and more specifically a kite shape in which two pairs of equal length sides are adjacent to one another. These projections each have a forward oriented cutting or drilling edge 98 that may also assist in a drilling or cutting action as the soil nail assembly is advanced into the drilled hole.

Referring to FIGS. 12 and 13, yet another embodiment for a coupler 100 is illustrated. This embodiment is illustrated as being similar to the embodiment of FIG. 10 with like reference numbers being shown corresponding to the same described features. The difference in this embodiment is the addition of one or more ports 102 made in the body 84 of the coupler. One primary purpose for the ports 102 is to create better mixing of grout in which grout is capable of passing through the body of the coupler 84 and out through the ports 102. The spinning or rotating action of the coupler during installation induces better mixing action of the grout as it passes out through the ports within the drilled hole. In one configuration, three equally spaced ports 102 can be provided on the body of the coupler 100 and therefore, the ports are spaced approximately 120° from one another on a circumference of the coupler. The ports 102 can be sized and positioned on the body of the coupler to best achieve desired mixing for the grout. Accordingly, the ports may have a preselected diameter and angular orientation with respect to the circumference of the coupler. For grout having a comparatively thicker consistency, it may be desired to maximize the size of the ports to ensure grout flow through the ports. Conversely, for grout having a comparatively thinner or more liquid-like consistency, it may be desired to reduce the size of the ports. Referring to FIG. 12, one port 102 is shown in which the port is angled such that the port extends through the body of the coupler at a slight angle to a vertical section of the coupler. More particularly as shown, the angle is generally directed in the same direction of the longitudinal axis A-A; however, it is also contemplated that the ports may be provided at other directions and angles, to include different directions and angles for each of the ports within the same coupler.

Referring to FIG. 13, a vertical cross-section is illustrated showing two other ports 102. As shown, each of these ports 102 communicates with the interior 104 of the coupler. Further as shown, the threaded interior bore 37 of the coupler may terminate at the location(s) 106 where the ports enter the body of the coupler such that the interior of the coupler at those location(s) 106 define a smooth bore within the body 84. In the embodiment of FIG. 13, the two ports 102 are aligned with one another such that interior threading terminates at the same general location 106; however, each of the ports could be slightly spaced from one another along the length of the body 84 such that respective locations 106 could collectively define a larger unthreaded interior portion of the body. As also shown, the angle of the port 102 at the lower end of the figure is angled differently from the port 102 illustrated in FIG. 12.

The ports 102 are located towards the middle portion of the coupler 84 where the ends of the soil nail sections 40 are not threaded into the coupler. As required, the depth to which the soil nail sections 40 are threaded into the coupler can be modified based upon the number and spacing of ports 120 desired to be used for grout mixing. For example, if there is a plurality of ports 120 spaced from one another along the length of the coupler, the soil nail sections 40 can be selectively threaded into the coupler at the appropriate depths so that the desired number of ports 120 remain open to receive grout. If there is but a single group of ports 120 circumferentially arranged with one another and communicating with the same defined interior location 106, the soil nail sections would simply be threaded into the coupler a depth so that the ends of the soil nail sections 40 would not cover the ports 120 at that circumferential location.

The preferred embodiments illustrated for the couplers are shown with sets of two or three projections; however, it shall be understood that more than three projections are contemplated. Further, although the particular depth, length, width, and thickness of the projections are not defined, it should also be understood that these dimensions may be modified in order to best achieve the specific purpose of the coupler to be installed. Further, each of the couplers may include a specification for a "breakaway" strength in which the projections are designed to breakaway at certain pressures or torques so that the soil nail assembly is not damaged in the event the projections present excessive resistance as a hole is drilled.

The invention has been particularly described with respect to various preferred embodiments, but it shall be understood that these embodiments are not intended to limit the invention, and the invention should therefore be considered in conjunction with the scope of the claims appended hereto.

What is claimed is:

1. A coupler especially adapted for use in interconnecting of drilled soil nails, said coupler comprising:
   a body having a threaded opening formed through the body, said body having a length and a longitudinal axis, said threaded opening extending along said longitudinal axis;
   a plurality of planar shaped projections mounted to an exterior surface of said body, said projections extending radially outward from said longitudinal axis, and said projections having a length extending parallel with a length of said coupler, said plurality of planar shaped projections further having a frangible joint, wherein said frangible joint breaks at a predetermined stress or torque separating said plurality of projections from said body; and
   at least one port formed in said body and communicating with said threaded opening.

2. The coupler, as claimed in claim 1, wherein:
   said projections are substantially evenly spaced about a periphery of said body.

3. The coupler, as claimed in claim 1, wherein:
   said body and said plurality of projections are integrally formed in a casting process.

4. The coupler, as claimed in claim 1, wherein:
   said body and said plurality of projections are integrally formed in a forging process.

5. The coupler, as claimed in claim 1, wherein:
   said projections are welded to said exterior surface of said body.

6. The coupler, as claimed in claim 1, wherein:
   at least one of said plurality of projections has a forward oriented cutting edge for cutting or drilling as said coupler is advanced into a hole in the ground.

7. The coupler, as claimed in claim 1, wherein:
   said at least one port includes a plurality of ports.

8. The coupler, as claimed in claim 1, wherein:
   said at least one port includes a plurality of ports spaced from one another circumferentially around the exterior surface of said body and each port communicating with said threaded opening.

9. The coupler, as claimed in claim 1, wherein:
   said at least one port includes a plurality of ports spaced from one another along the length of said body and each port communicating with said threaded opening.

10. The coupler, as claimed in claim 1, wherein:
    said at least one port includes a plurality of ports, and each port having a different sized diameter.

11. The coupler, as claimed in claim 1, wherein:
    said at least one port includes a plurality of ports, and each port having a different angular orientation with respect to said body.

12. The coupler, as claimed in claim 1, wherein:
    threads of said threaded opening terminate at a location where said port communicates with said threaded opening.

13. The coupler, as claimed in claim 1, wherein said threaded opening extends through the entire length of said body.

14. A soil nail assembly installed by drilling, comprising:
    a first coupler including (i) a body having a threaded opening formed through the body, said body having a length and a longitudinal axis, said threaded opening extending along said longitudinal axis; (ii) a plurality of planar shaped projections mounted to an exterior surface of said body, said projections extending radially outward from said longitudinal axis and extending parallel with said longitudinal axis; and (iii) at least one port formed in said body and communicating with said threaded opening;
    a first section of soil nail having a proximal first end and a distal second end, said distal second end threadably received in a first end of said first coupler;
    a second section of soil nail having a proximal first end and a distal second end, said proximal first end threadably received in a second end of said first coupler;
    a drill bit secured to said distal second end of said second section of soil nail; and
    said first and second sections of soil nail having hollow cores such that a continuous opening is formed through the first coupler and the first and second sections of soil nail.

15. The soil nail assembly, as claimed in claim 14, wherein:
    said drill bit has at least one bore formed through said drill bit such that the continuous opening is formed through the first coupler, the first and second sections of soil nail, and the drill bit.

16. The soil nail assembly, as claimed in claim 14, wherein:
    said at least one port includes a plurality of ports.

17. The soil nail assembly, as claimed in claim 14, wherein:
    said at least one port includes a plurality of ports spaced from one another circumferentially around the exterior surface of said body and each port communicating with said threaded opening.

18. The soil nail assembly, as claimed in claim 14, wherein:
    said at least one port includes a plurality of ports spaced from one another along the length of said body and each port communicating with said threaded opening.

19. The soil nail assembly, as claimed in claim 14, wherein:
   said at least one port includes a plurality of ports, and each port having a different sized diameter.

20. The soil nail assembly, as claimed in claim 14, wherein:
   said at least one port includes a plurality of ports, and each port having a different angular orientation with respect to said body.

21. The soil nail assembly, as claimed in claim 14, wherein:
   threads of said threaded opening terminate at a location where said port communicates with said threaded opening.

\* \* \* \* \*